(12) United States Patent
Gravano et al.

(10) Patent No.: US 7,814,103 B1
(45) Date of Patent: *Oct. 12, 2010

(54) SYSTEMS AND METHODS FOR USING ANCHOR TEXT AS PARALLEL CORPORA FOR CROSS-LANGUAGE INFORMATION RETRIEVAL

(75) Inventors: Luis Gravano, New York, NY (US); Monika H. Henzinger, Corseaux (CH)

(73) Assignee: Google Inc., Mountain View, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 11/468,674

(22) Filed: Aug. 30, 2006

Related U.S. Application Data (63) Continuation of application No. 09/939,661, filed on Aug. 28, 2001, now Pat. No. 7,146,358.

(51) Int. Cl.
*G06F 17/30* (2006.01)
(52) U.S. Cl. ...................... 707/736; 707/760
(58) Field of Classification Search ............... None
See application file for complete search history.

(56) References Cited

U.S. PATENT DOCUMENTS

| | | | | |
|---|---|---|---|---|
| 5,088,038 A | * | 2/1992 | Tanaka et al. | 704/2 |
| 5,579,224 A | | 11/1996 | Hirakawa et al. | 704/2 |
| 5,873,056 A | | 2/1999 | Liddy et al. | 704/9 |
| 5,991,710 A | * | 11/1999 | Papineni et al. | 704/2 |
| 6,006,221 A | * | 12/1999 | Liddy et al. | 707/5 |
| 6,092,034 A | * | 7/2000 | McCarley et al. | 704/2 |
| 6,094,652 A | | 7/2000 | Faisal | 707/5 |
| 6,119,078 A | * | 9/2000 | Kobayakawa et al. | 704/3 |
| 6,161,082 A | * | 12/2000 | Goldberg et al. | 704/3 |

(Continued)

OTHER PUBLICATIONS

Douglas W. Oard, A comparative study of query and Document translation for Cross-Language Information Retrieval, Jan. 1, 1998, Springer Berlin, vol. 1529, pp. 472-783.*

(Continued)

*Primary Examiner*—Neveen Abel Jalil
*Assistant Examiner*—Jacques Veillard
(74) *Attorney, Agent, or Firm*—Harrity & Harrity, LLP (57) ABSTRACT

A system performs cross-language query translations. The system receives a search query that includes terms in a first language and determines possible translations of the terms of the search query into a second language. The system also locates documents for use as parallel corpora to aid in the translation by: (1) locating documents in the first language that contain references that match the terms of the search query and identify documents in the second language; (2) locating documents in the first language that contain references that match the terms of the query and refer to other documents in the first language and identify documents in the second language that contain references to the other documents; or (3) locating documents in the first language that match the terms of the query and identify documents in the second language that contain references to the documents in the first language. The system may use the second language documents as parallel corpora to disambiguate among the possible translations of the terms of the search query and identify one of the possible translations as a likely translation of the search query into the second language.

27 Claims, 8 Drawing Sheets

U.S. PATENT DOCUMENTS

| | | | | |
|---|---|---|---|---|
| 6,212,537 | B1 | 4/2001 | Nosohara | 715/536 |
| 6,263,329 | B1 | 7/2001 | Evans | 707/3 |
| 6,285,978 | B1* | 9/2001 | Bernth et al. | 704/7 |
| 6,321,189 | B1* | 11/2001 | Masuichi et al. | 704/7 |
| 6,347,316 | B1* | 2/2002 | Redpath | 707/10 |
| 6,349,276 | B1 | 2/2002 | McCarley | 707/4 |
| 6,360,196 | B1* | 3/2002 | Poznanski et al. | 704/8 |
| 6,393,389 | B1* | 5/2002 | Chanod et al. | 704/7 |
| 6,418,431 | B1 | 7/2002 | Mahajan et al. | 707/4 |
| 6,490,548 | B1 | 12/2002 | Engel | 704/10 |
| 6,604,101 | B1* | 8/2003 | Chan et al. | 707/4 |
| 6,876,998 | B2* | 4/2005 | Evans | 707/3 |
| 7,111,237 | B2* | 9/2006 | Chan | 715/536 |
| 7,146,358 | B1* | 12/2006 | Gravano et al. | 707/4 |
| 2005/0086214 | A1* | 4/2005 | Seewald et al. | 707/3 |
| 2006/0100849 | A1* | 5/2006 | Chan | 704/8 |

OTHER PUBLICATIONS

Wen-Hsiang Lu et al., Translation of Web Queries Using Anchor Text Mining, Jun. 2002, ACM Transaction on Asian Language Information Processing, vol. 1, Issue 2, pp. 159-172.*

W.-H. Lu et al., Anchor Text for Translation of Web Queries: A Transitive Translation Approach, Apr. 2004, ACM Transaction on Information Systems. vol. 22, Issue 2, pp. 242-269.*

Jiang Chen et al., Parallel Web Text mining for Cross-language IR, Feb. 24, 2000, ACM, pp. 1-16.*

Nadav Eiron et al., Analysis of Anchor Text for Web Search, Jun. 2003, ACM SIGIR Conference on Research and Development in Information Retrieval, pp. 1-8.*

L. Ballesteros, W.B. Croft, "Resolving Ambiguity for Cross-Language Retrieval," Proceedings of ACM SIGIR, pp. 64-71, 1998.

Ruiz, Miguel et al., "CINDOR Conceptual Interlingua Document Retrieval: TREC-8 Evaluation," 10 pages, 1998.

T. Davis and T. Dunning, "Query Translation Using Evolutionary Programming for Multi-lingual Information Retrieval," In Proceedings of the Fourth Annual Conference on Evolutionary Programming, 11 pages, 1995.

Tiedemann, Jörg, "Extraction of Translation Equivalents from Parallel Corpora," In Proceedings of the $11^{th}$ Nordic Conference on Computational Linguistics NODALI98, Center for Sprogteknologi and Department of General and Applied Linguistics, University of Copenhagen, pp. 1-7, 1998.

Kang, Insu et al., "Cross-Language Text Retrieval by Query Translation Using Term Reweighting," International Journal of Pattern Recognition and Artificial Intelligence, vol. 14, No. 5, pp. 617-629, 2000.

Yang, Yiming et al., "Translingual Information Retrieval: Learning from Bilingual Corpora," AI Journal special issue: Best of IJCAI-97, pp. 1-20, 1998.

Gregory Grefenstette, "The World Wide Web as a Resource for Example-Based Machine Translation Tasks", Proceedings of ASLIB Conference on Translating and the Computer, 1998; 12 pages.

* cited by examiner

SYSTEMS AND METHODS FOR USING ANCHOR TEXT AS PARALLEL CORPORA FOR CROSS-LANGUAGE INFORMATION RETRIEVAL

RELATED APPLICATIONS

This application is a continuation of U.S. patent application Ser. No. 09/939,661 filed Aug. 28, 2001, which is hereby incorporated by reference.

BACKGROUND OF THE INVENTION

1. Field of the Invention

The present invention relates generally to information retrieval systems and, more particularly, to systems and methods for translating search queries for cross-language information retrieval.

2. Description of Related Art

Many users of a hypertext medium, such as the World Wide Web ("web"), can read documents in more than one language. Consider, for example, a query in English from a user that can read English and Spanish. A conventional technique for identifying documents in Spanish for this English query involves translating the query to Spanish and then processing the translated query to identify matching Spanish documents.

Query terms are inherently ambiguous. Therefore, translating them is challenging. Some conventional approaches use a bilingual dictionary to perform query translations. It has been found, however, that using a bilingual dictionary results in noisy translations. The noisy translations may be due to many factors. For example, a translation may result in extraneous terms being added to the query because a dictionary entry may list several senses for a term. In other words, each term may have one or more possible translations in the dictionary. Also, general dictionaries often do not include technical terminology. This makes translation of technical query terms difficult.

Other conventional approaches rely either on "parallel corpora" (i.e., collections of documents in which each of the documents appears in two different languages) or "co-occurrence statistics" of terms in documents in the target language to which the query is being translated to translate query terms. A problem with the parallel corpora approach is that such corpora are rare and building them is prohibitively expensive.

As a result, there exists a need for mechanisms that translate queries to facilitate cross-language information retrieval.

SUMMARY OF THE INVENTION

Systems and methods consistent with the present invention address this and other needs by providing mechanisms for translating search queries that exploit anchor text in one language that refer to documents in another language to produce good quality, less noisy query translations.

In accordance with the principles of the invention as embodied and broadly described herein, a system performs cross-language query translations. The system receives a search query that includes terms in a first language and determines possible translations of the terms of the search query into a second language. The system also locates documents in the first language that contain references that match the terms of the search query and identify documents in the second language. The system then disambiguates among the possible translations of the terms of the search query using the identified documents to identify one of the possible translations as a likely translation of the search query into the second language.

In another implementation consistent with the present invention, a method for performing cross-language document retrieval is provided. The method includes receiving a search query that includes one or more terms in a first language; performing a search of documents in the first language to locate one or more of the first language documents that contain anchor text that matches the search query and identifies one or more documents in a second language; determining possible translations of the terms of the search query into the second language; using the identified second language documents as parallel corpora for disambiguation among the possible translations of the terms of the search query; identifying one of the possible translations as a correct translation of the search query based on the disambiguation; and performing a search of second language documents using the correct translation of the search query.

In yet another implementation consistent with the present invention, a system for performs cross-language query translations. The system receives a search query that includes terms in a first language and determines possible translations of the terms of the search query into a second language. The system also locates documents in the first language that contain references that match the terms of the search query and refer to other documents in the first language and identify documents in the second language that contain references to the other documents. The system then disambiguates among the possible translations of the terms of the search query using the identified documents to identify one of the possible translations as a likely translation of the search query.

In a further implementation consistent with the present invention, a method for performing cross-language query translation is provided. The method includes receiving a search query that includes terms in a first language; determining possible translations of the terms of the search query into a second language; locating documents in the first language that match the terms of the search query; identifying documents in the second language that contain references to the first language documents; and disambiguating among the possible translations of the terms of the search query using the second language documents to identify one of the possible translations as a likely translation of the search query.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention translate search queries to facilitate information retrieval in different languages. The systems and methods use anchors in one language that link to documents in another language to produce good quality, less noisy translations.

Exemplary Network Configuration

Figure 1:
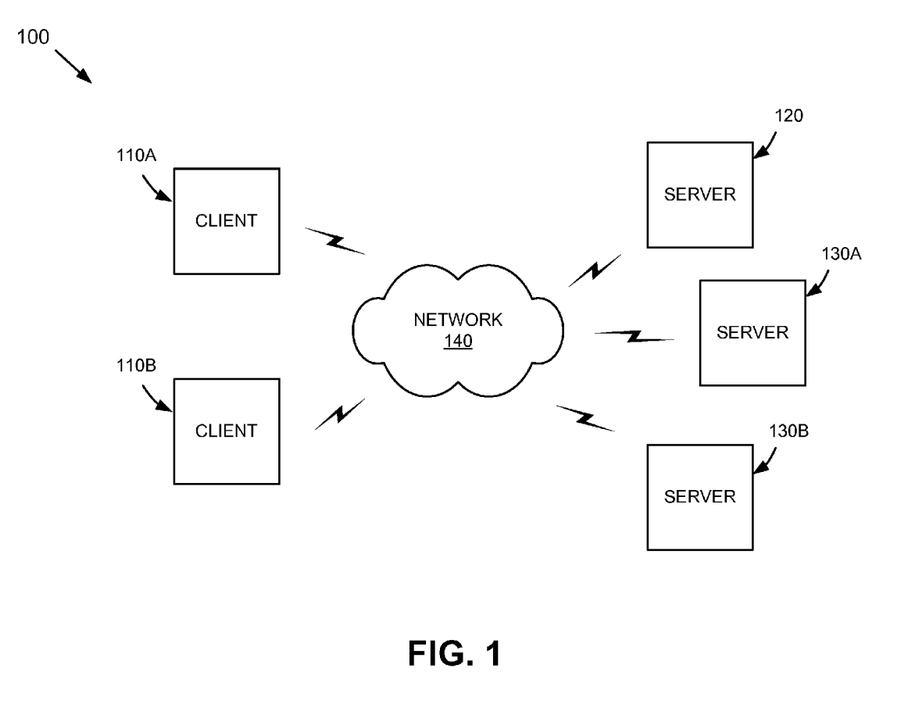
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110A, 110B connected to multiple servers 120-130A, 130B via a network 140. The network 140 may include a local area network (LAN), a wide area network (WAN), a telephone network, such as the Public Switched Telephone Network (PSTN), an intranet, the Internet, a similar or dissimilar network, or a combination of networks. Two clients 110A, 110B and three servers 120-130A, 130B have been illustrated as connected to network 140 in FIG. 1 for simplicity. In practice, there may be more or fewer clients and servers. Also, in some instances, a client may perform the functions of a server and a server may perform the functions of a client.

The clients 110A, 110B may include devices, such as wireless telephones, personal computers, personal digital assistants (PDAs), laptops, or other types of communication devices, threads or processes running on these devices, and/or objects executable by these devices. The servers 120-130A, 130B may include server devices, threads, and/or objects that operate upon, search, or maintain documents in a manner consistent with the present invention. The clients 110A, 110B and servers 120-130A, 130B may connect to the network 140 via wired, wireless, or optical connections.

In an implementation consistent with the present invention, the server 120 may include a search engine usable by the clients 110A, 110B. The servers 130A, 130B may store documents, such as web documents or web pages, accessible by the clients 110A, 110B and the server 120.

Exemplary Server Architecture

Figure 2:
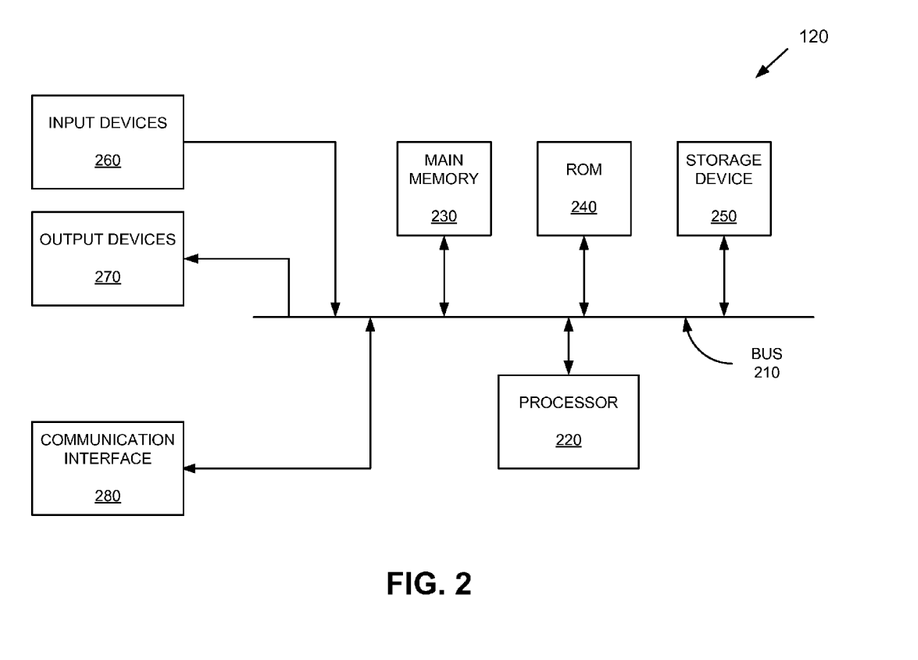
FIG. 2 is an exemplary diagram of a server of FIG. 1 in an implementation consistent with the present invention.

FIG. 2 is an exemplary diagram of the server 120 in an implementation consistent with the present invention. The server 120 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the server 120.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit an operator to input information to the server 120, such as a keyboard, a mouse, a pen, voice recognition and/or biometric mechanisms, etc. The output devices 270 may include one or more conventional mechanisms that output information to the operator, including a display, a printer, a speaker, etc. The communication interface 280 may include any transceiver-like mechanism that enables the server 120 to communicate with other devices and/or systems. For example, the communication interface 280 may include mechanisms for communicating with another device or system via a network, such as network 140.

As will be described in detail below, the server 120, consistent with the present invention, perform certain searching-related operations. The server 120 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Query Translation Mechanisms

Figure 3:
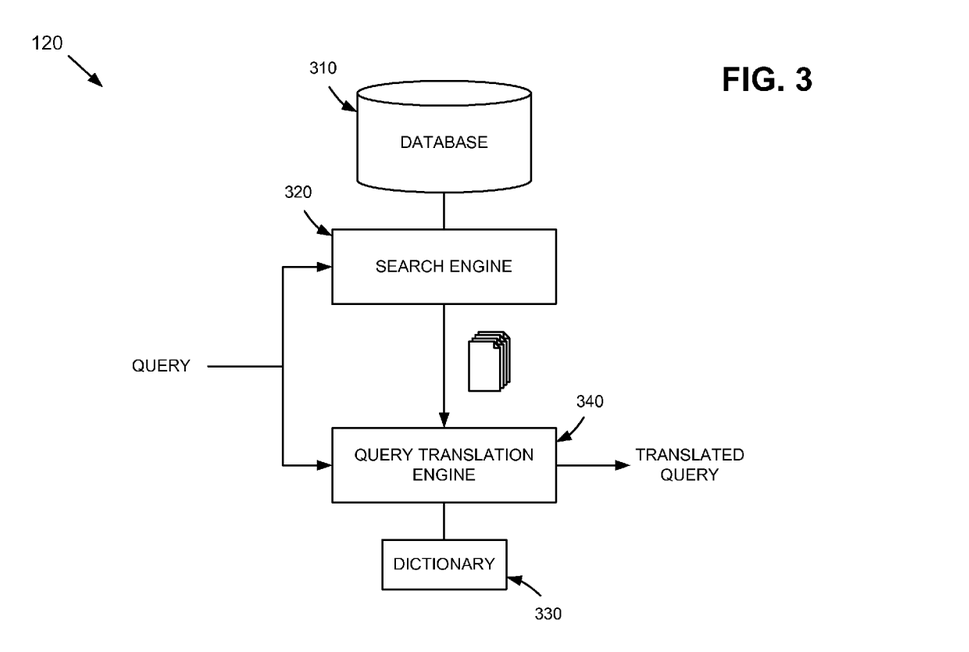
FIG. 3 is an exemplary functional diagram of a query translation portion of the server of FIG. 2 according to an implementation consistent with the present invention.

FIG. 3 is an exemplary functional diagram of a portion of the server 120 according to an implementation consistent with the present invention. This portion of the server 120 may be implemented in software, hardware, or a combination of software and hardware.

The portion of the server 120 shown in FIG. 3 includes a database 310, a search engine 320, a dictionary 330, and a query translation engine 340. The database 310 may store copies of web documents stored by other servers 130 in the network 140 and/or a tree or directed graph of linked web documents. The documents and directed graph may be stored in the database 310 by a spider program that "crawls" web documents on network 140 based on their hyperlinks. As a result, the spider program may generate a tree or directed graph of linked web documents. The crawled documents may be stored in the database as an inverted index in which each term in the database 310 is associated with all the crawled documents that contain that term.

Figure 4:
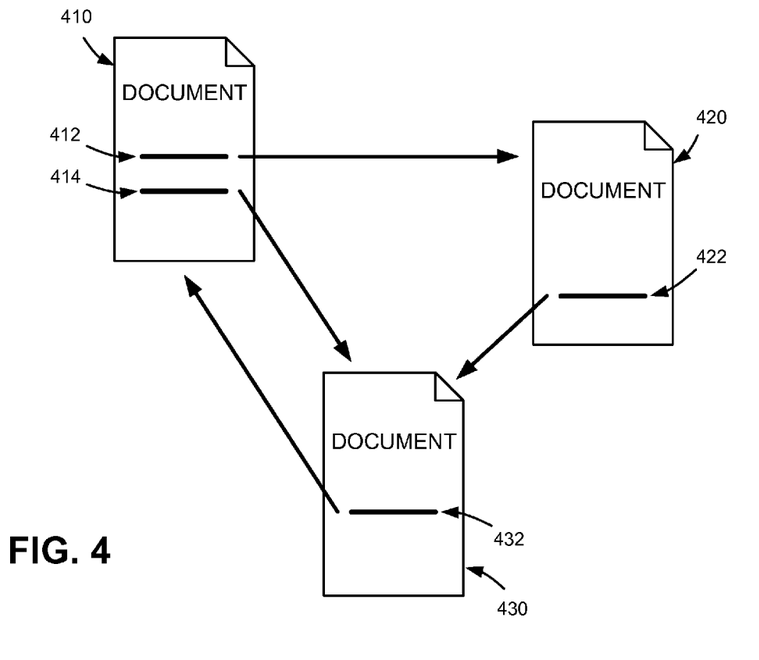
FIG. 4 is a diagram illustrating relations between an exemplary set of web documents that may be stored in the database of FIG. 3.

FIG. 4 is a diagram illustrating relations between an exemplary set of web documents that may be stored in the database 310. Documents 410-430 contain links to each other. In the nomenclature of the popular Hyper-Text Markup Language (HTML) standard, hyperlinks to other documents are specified using an HTML structure called an anchor. An anchor specifies the Uniform Resource Locator (URL) of the document being linked. Typically, browsers display anchors as text distinct from the main text using, for example, underlining or different colors. A user, by selecting the anchor, causes the browser to retrieve the web document specified by the URL.

In FIG. 4, documents 410-430 contain various links. In particular, document 410 contains an anchor 412 that corresponds to a forward link to document 420 and an anchor 414 that corresponds to a forward link to document 430. Document 420 contains an anchor 422 that corresponds to a forward link to document 430. Document 430 contains an anchor 432 that corresponds to a forward link to document 410.

Returning to FIG. 3, the search engine 320 may include logic that identifies one or more documents or a list of documents in response to a search query that includes one or more search terms. For example, the search engine 320 may receive a search query from a user and respond by returning relevant information or a list of relevant information to the user. Typically, users may ask the server 120 to locate web documents relating to a particular topic that are stored at other devices or systems connected to network 140 or another network. The search engine 320 may access the database 310 to compare the terms in the search query to the documents in the database 310.

The dictionary 330 may include one or more bilingual machine-readable dictionaries. The dictionary 330 may provide information to facilitate translations between multiple languages. The information in the dictionary 330 may be used by the query translation engine 340 to translate terms in a search query.

The query translation engine 340 may include logic that translates the terms of a search query using information from the dictionary 330 and the search engine 320. For example, the query translation engine 340 may identify potential translations for the terms of a search query based on the information in the dictionary 330. The query translation engine 340 may then disambiguate among the potential translations based on text from documents identified by the search engine 320, as described below.

Exemplary Processing for Query Translation

Figure 5:
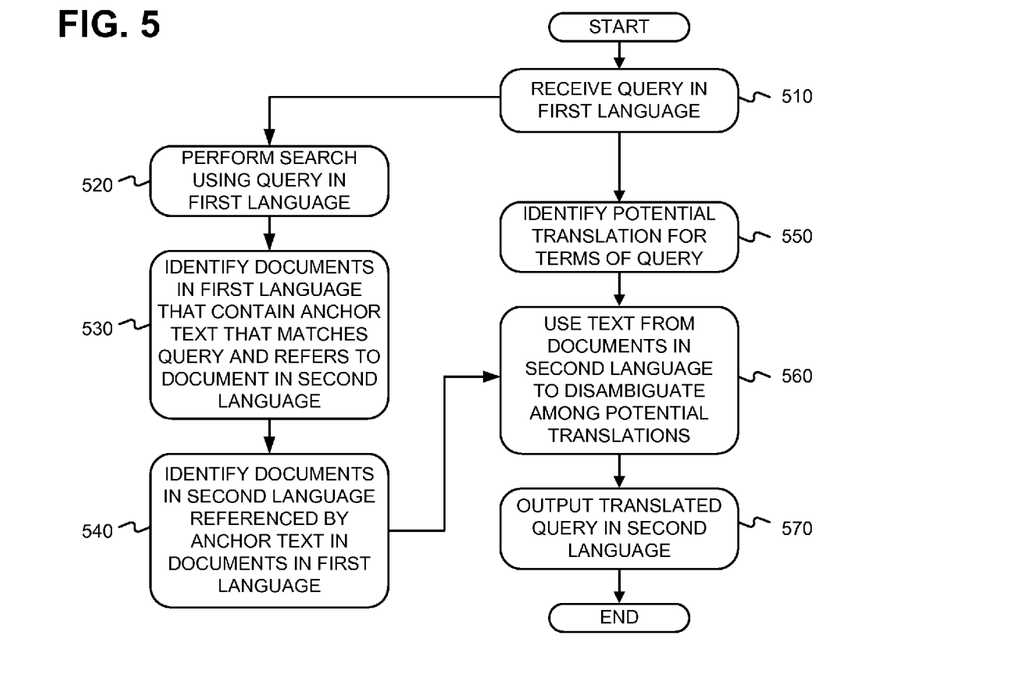
FIG. 5 is a flowchart of exemplary processing for translating a search query in accordance with an implementation consistent with the present invention.

FIG. 5 is a flowchart of exemplary processing for performing query translation in accordance with an implementation consistent with the present invention. Processing may begin with a user accessing a server, such as server 120 (FIG. 1), using, for example, web browser software on a client, such as client 110. The user may then provide a query that includes one or more search terms to the search engine 320 (FIG. 3) maintained by the server 120 (act 510).

Figure 6:
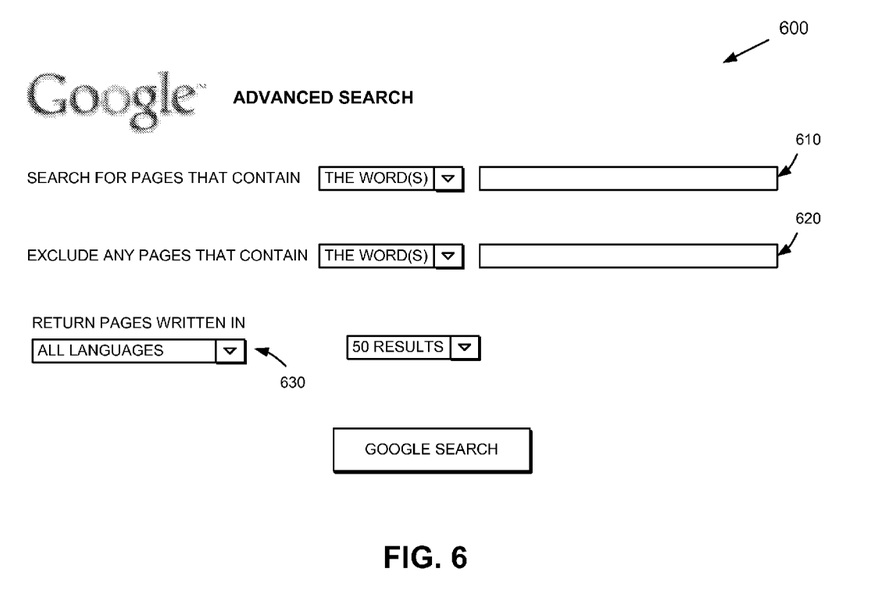
FIG. 6 is a diagram of an exemplary graphical user interface that may be presented to the user to facilitate the providing of search information.

Assume, for purposes of this example, that the user provides search terms in a first language and desires documents in a second language. To facilitate the providing of information for a search, the server 120 may provide a graphical user interface (GUI) to the user. FIG. 6 is an exemplary diagram of a GUI 600 consistent with the present invention. The GUI 600 may prompt the user to enter one or more search terms/words to include (box 610) or exclude (box 620) in the search results. The GUI 600 may also prompt the user to identify the language(s) in which the results will be presented (box 630).

Returning to FIG. 5, the search engine 320 may perform a search using the terms of the query in the first language (act 520). In this case, the search engine 320 looks for documents in the first language that contain anchor text that matches the search query and refers to a document in the second language (act 530). When determining whether there is a match between the terms of the search query and the anchor text, the search engine 320 may consider not only the text making up the anchor, but also surrounding text, such as the text in the paragraph containing the anchor. The search engine 320 may then identify the documents in the second language that are referenced by the anchor text in the first documents (act 540) and provides these documents to the query translation engine 340.

Meanwhile, the query translation engine 340 may perform an initial translation on the terms of the search query. For example, the query translation engine 340 may use the dictionary 330 to identify potential translations for terms in the query (act 550). A dictionary entry may have several senses for a term, however, leading to several possible translations.

To disambiguate among the potential translations, the query translation engine 340 may use conventional parallel corpora disambiguation techniques, such as the techniques identified in Y. Yang et al., "Translingual Information Retrieval: Learning from Bilingual Corpora," Artificial Intelligence Journal special issue: Best of IJCAI-97, 1998, pp. 323-345, and L. Ballesteros et al., "Resolving Ambiguity for Cross-Language Retrieval," Proceedings of ACM SIGIR, 1998, pp. 64-71, which are incorporated herein by reference. According to an implementation consistent with the present invention, however, the query translation engine 340 uses the text from the documents in the second language that were identified by the search engine 320 as the parallel corpora (act 560). Because these documents possibly contain text related to the original search query, the translations produced by the query translation engine 340 are of good quality and less noisy.

The query translation engine 340 may then output the translated query (in the second language) (act 570). The search engine 320, or another search engine, may identify documents in the second language that correspond to the translated query and present the documents to the user.

EXAMPLE

Assume that a user provides a search query to the server 120 in Spanish, but desires documents to be returned in English. Further, assume that the user desires documents relating to "banks interest." In this case, the query provided by the user may include the terms "bancos" and "interés." To facilitate English-language document retrieval, the server 120 may translate the Spanish query to English.

The query translation engine 340 may perform an initial translation of the terms of the query using, for example, the dictionary 330. In this case, the query translation engine 340 finds that each of the terms of the query has more than one possible translation. For example, the Spanish word "bancos" could be translated as "banks" or "benches" (among other possibilities) in English. The Spanish word "interés" could be translated as "interest" or "concern" (among other possibilities) in English. The query translation engine 340 disambiguates among the possible translations using documents identified by the search engine 320.

The search engine 320 performs a search using the original Spanish query (i.e., "bancos interés") to identify Spanish-language documents that include anchors that contain all of the query terms and point to English-language documents. The search engine 320 provides the English-language documents that are pointed to by the anchors to the query translation engine 340.

The query translation engine 340 analyzes the text of the English-language documents to, for example, compute the frequency of co-occurrence of the various translation possibilities. Specifically, the query translation engine 340 determines how often the word "banks" occurs with "interest," "banks" occurs with "concern," "benches" occurs with "interest," and "benches" occurs with "concern." Presumably, the query translation engine 340 would determine that "banks" and "interest" are the most frequent combination and use these terms as the correct translation for the Spanish query "bancos interés."

Alternate Implementations

Figure 7:
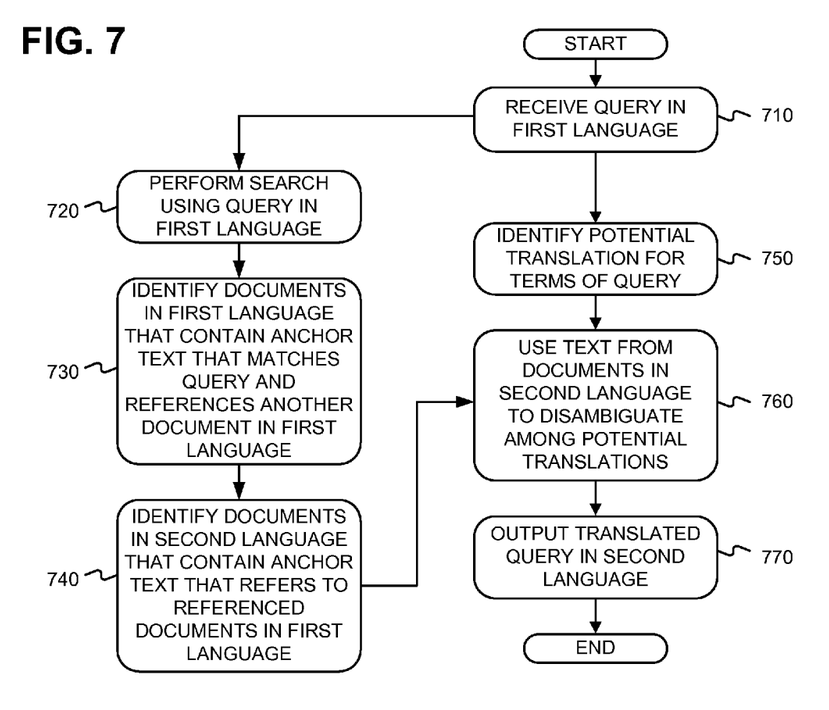
FIG. 7 is a flowchart of exemplary processing for performing query translation in accordance with an alternate implementation consistent with the present invention.

FIG. 7 is a flowchart of exemplary processing for performing query translation in accordance with an alternate implementation consistent with the present invention. Processing may begin with a user accessing a server, such as server 120 (FIG. 1), using, for example, web browser software on a client, such as client 110. The user may then provide a query that includes one or more search terms to the search engine 320 (FIG. 3) maintained by the server 120 (act 710).

Assume, for purposes of this example, that the user provides search terms in a first language and desires documents in a second language. To facilitate the providing of information for a search, the server 120 may provide a GUI to the user, such as the one illustrated in FIG. 6.

The search engine 320 may perform a search using the terms of the query in the first language (act 720). In this case, the search engine 320 looks for documents in the first language that contain anchor text that matches the search query and references another document in the first language (act 730). When determining whether there is a match between the terms of the search query and the anchor text, the search engine 320 may consider not only the text making up the anchor, but also surrounding text, such as the text in the paragraph containing the anchor.

The search engine 320 may then identify documents in the second language that contain anchor text that refers to the referenced documents in the first language (act 740). The search engine 320 may provide these documents to the query translation engine 340.

Meanwhile, the query translation engine 340 may perform an initial translation on the terms of the search query. For example, the query translation engine 340 may use the dictionary 330 to identify potential translations for terms in the query (act 750). A dictionary entry may have several senses for a term, however, leading to several possible translations.

To disambiguate among the potential translations, the query translation engine 340 may use conventional parallel corpora disambiguation techniques, such as the ones described above. According to an implementation consistent with the present invention, however, the query translation engine 340 uses the text from the documents in the second language that were identified by the search engine 320 as the parallel corpora (act 760). The text used by the query translation engine 340 may include the anchor, text surrounding the anchor, or the entire text of the documents. Because these documents possibly contain text related to the original search query, the translations produced by the query translation engine 340 are of good quality and less noisy.

The query translation engine 340 may then output the translated query (in the second language) (act 770). The search engine 320, or another search engine, may identify documents in the second language that correspond to the translated query and present the documents to the user.

Figure 8:
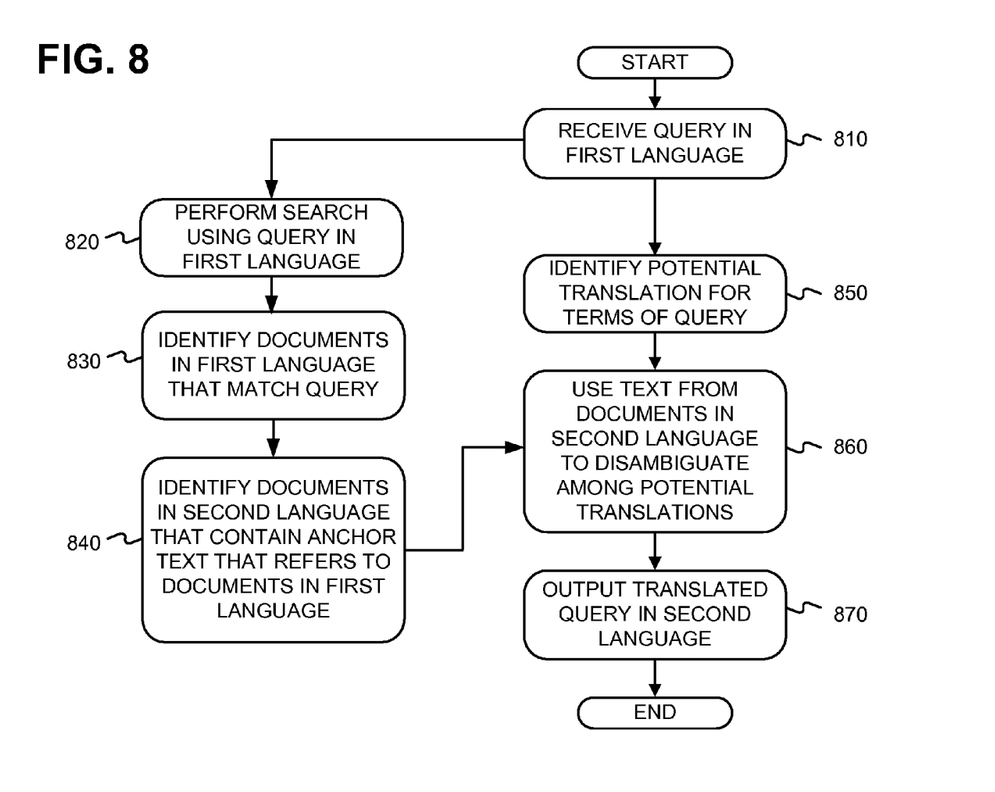
FIG. 8 is a flowchart of exemplary processing for performing query translation in accordance with another implementation consistent with the present invention.

FIG. 8 is a flowchart of exemplary processing for performing query translation in accordance with another implementation consistent with the present invention. Processing may begin with a user accessing a server, such as server 120 (FIG. 1), using, for example, web browser software on a client, such as client 110. The user may then provide a query that includes one or more search terms to the search engine 320 (FIG. 3) maintained by the server 120 (act 810).

Assume, for purposes of this example, that the user provides search terms in a first language and desires documents in a second language. To facilitate the providing of information for a search, the server 120 may provide a GUI to the user, such as the one illustrated in FIG. 6.

The search engine 320 may perform a search using the terms of the query in the first language (act 820). In this case, the search engine 320 looks for documents in the first language that contain text that matches the search query (act 830). For this implementation, the search engine 320 may match the terms of the query to any text in the documents. The search engine 320 may then identify documents in the second language that contain anchor text that refers to the documents in the first language (act 840). The search engine 320 may provide these documents to the query translation engine 340.

Meanwhile, the query translation engine 340 may perform an initial translation on the terms of the search query. For example, the query translation engine 340 may use the dictionary 330 to identify potential translations for terms in the query (act 850). A dictionary entry may have several senses for a term, however, leading to several possible translations.

To disambiguate among the potential translations, the query translation engine 340 may use conventional parallel corpora disambiguation techniques, such as the ones described above. According to an implementation consistent with the present invention, however, the query translation engine 340 uses the text from the documents in the second language that were identified by the search engine 320 as the parallel corpora (act 860). The text used by the query translation engine 340 may include the anchor, text surrounding the anchor, or the entire text of the documents. Because these documents possibly contain text related to the original search query, the translations produced by the query translation engine 340 are of good quality and less noisy.

The query translation engine 340 may then output the translated query (in the second language) (act 870). The search engine 320, or another search engine, may identify documents in the second language that correspond to the translated query and present the documents to the user.

CONCLUSION

Systems and methods consistent with the present invention provide good quality, less noisy search query translations by exploiting anchors in one language that point to documents in another language.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 5, the order of the acts may be modified in other implementations consistent with the present invention. Moreover, non-dependent acts may be performed in parallel.

Also, it has been described that the database 310, the search engine 320, and the query translation engine 340 are located on the same server 120. In other implementations consistent with the present invention, the database 310, the search engine 320, and/or the query translation engine 340 are located on different systems or devices.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method implemented by one or more processors associated with one or more server devices, the method comprising:

searching, using one or more processors associated with the one or more server devices, a plurality of documents, based on a search query that includes terms, in a first language, to identify one or more documents in the first language that include anchor text that matches at least one of the terms of the search query, where the anchor text refers to one or more documents in a second language that is different than the first language;

identifying the one or more documents in the second language; and translating, using one or more processors associated with the one or more server devices, the terms of the search query into the second language, using content included in the identified one or more documents in the second language, where the content includes one or more of the anchor text, text surrounding the anchor text, or an entire text of the one or documents in the second language.

2. The method of claim 1, where searching the plurality of documents comprises:

matching, using one or more processors associated with the one or more server devices, the search query to the anchor text of the identified one or more documents in the first language.

3. The method of claim 1, further comprising:

receiving, by one or more processors associated with the one or more server devices, the search query from a user.

4. The method of claim 3, where receiving the search query comprises:

presenting a graphical user interface to the user; and receiving the terms of the search query, in the first language, from the user via the graphical user interface.

5. The method of claim 1, where translating the terms of the search query into the second language comprises:

determining, using one or more processors associated with the one or more server devices, possible translations of the terms of the search query into the second language; and disambiguating, using one or more processors associated with the one or more server devices, among the possible translations of the terms of the search query using the content included in the one or more documents in the second language to identify one of the possible translations as a likely translation of the search query.

6. The method of claim 5, where the determining possible translations includes:

using, by one or more processors associated with the one or more server devices, a dictionary to identify the possible translations of the terms into the second language.

7. The method of claim 6, where the dictionary includes one or more bilingual machine-readable dictionaries.

8. The method of claim 5, where disambiguating among the possible translations of the terms of the search query comprises:

using, by one or more processors associated with the one or more server devices, text from the one or more documents, in the second language, as parallel corpora to disambiguate among the possible translations of the terms of the search query.

9. A method implemented by one or more processors associated with one or more server devices, the method comprising:

searching, by one or more processors associated with the one or more server devices, a plurality of documents, based on a search query that includes terms, in a first language, to identify one or more documents in the first language that refer to one or more other documents in the first language;

searching, using one or more processors associated with the one or more server devices, the plurality of documents to identify one or more documents in a second language that is different that the first language, the one or more documents in the second language including anchor text that matches at least one of the terms of the search query, where the anchor text refers to the one or more other documents in the first language; and translating, using one or more processors associated with the one or more server devices, the search query into the second language, using content included in the identified one or more documents in the second language, where the content includes one or more of the anchor text, text surrounding the anchor text, or an entire text of the identified one or documents in the second language.

10. The method of claim 9, where searching the plurality of documents comprises:

matching, using one or more processors associated with the one or more server devices, the search query to the anchor text of the identified one or more documents in the first language.

11. The method of claim 9, further comprising:

receiving, by one or more processors associated with the one or more server devices, the search query from a user.

12. The method of claim 9, where the receiving the search query comprises:

presenting a graphical user interface to the user; and receiving the terms of the search query in the first language from the user via the graphical user interface.

13. The method of claim 9, where translating the terms of the search query into the second language comprises:

determining, using one or more processors associated with the one or more server devices, possible translations of the terms of the search query into the second language; and disambiguating, using one or more processors associated with the one or more server devices, among the possible translations of the terms of the search query using the content included in the one or more documents in the second language to identify one of the possible translations as a likely translation of the search query.

14. The method of claim 13, where the determining possible translations includes:

using, by one or more processors associated with the one or more server devices, a dictionary to identify the possible translations of the terms into the second language.

15. The method of claim 14, where the dictionary includes one or more bilingual machine-readable dictionaries.

16. The method of claim 13, where disambiguating among the possible translations of the terms of the search query comprises:

using, by one or more processors associated with the one or more server devices, text from the one or more documents in the second language as parallel corpora to disambiguate among the possible translations of the terms of the search query.

17. A method implemented by one or more processors associated with one or more server devices, the method comprising:

searching, using one or more processors associated with the one or more server devices, a plurality of documents, based on a search query that includes terms, in a first language, to identify one or more documents in the first language;

searching, using one or more processors associated with the one or more server devices, the plurality of documents to identify one or more documents in a second language that is different than the first language, the one or more documents in the second language including anchor text that matches at least one of the terms of the search query, where the anchor text refers to the one or more document in the first language; and translating, using one or more processors associated with the one or more server devices, the search query into the second language, using content included in the identified one or more documents in the second language, where the content includes one or more of the anchor text, text surrounding the anchor text, or an entire text of the identified one or documents in the second language.

18. The method of claim 17, where searching the plurality of documents comprises:

matching, using one or more processors associated with the one or more server devices, the search query to text of the identified one or more documents in the first language.

19. The method of claim 17, further comprising:

receiving, by one or more processors associated with the one or more server devices, the search query from a user.

20. The method of claim 17, where the receiving the search query comprises:

presenting a graphical user interface to the user; and receiving the terms of the search query, in the first language, from the user via the graphical user interface.

21. The method of claim 17, where translating the terms of the search query into the second language comprises:

determining, using one or more processors associated with the one or more server devices, possible translations of the terms of the search query into the second language; and disambiguating, using one or more processors associated with the one or more server devices, among the possible translations of the terms of the search query using the content included in the one or more documents in the second language to identify one of the possible translations as a likely translation of the search query.

22. The method of claim 21, where the determining possible translations includes:

using, by one or more processors associated with the one or more server devices, a dictionary to identify the possible translations of the terms into the second language.

23. The method of claim 22, where the dictionary includes one or more bilingual machine-readable dictionaries.

24. The method of claim 21, where disambiguating among the possible translations of the terms of the search query comprises:

using, by one or more processors associated with the one or more server devices, text from the one or more documents in the second language as parallel corpora to disambiguate among the possible translations of the terms of the search query.

25. A system, comprising:

a database of documents in a plurality of languages;

one or more processors;

a memory device to store instructions that when executed by the one or more processors, cause the one or more processors to:

search the database of documents, based on a search query that includes terms in a first language, to identify one or more documents in the first language that include anchor text that matches one or more of the terms of the search query, where the anchor text refers to one or more documents in a second language that is different than the first language; and translate the terms of the search query into the second language using content included in the one or more documents in the second language, where the content includes one or more of the anchor text, text surrounding the anchor text, or an entire text of the one or documents in the second language.

26. The system of claim 25, where when translating the terms of the search query into the second language, the one or more processors are further to:

determine possible translations of the terms of the search query into the second language; and disambiguate among the possible translations of the terms of the search query using the content included in the one or more documents in the second language to identify one of the possible translations as a likely translation of the search query.

27. The system of claim 26, where when disambiguating among the possible translations of the terms of the search query, the one or more processors are further to:

identify possible translations of the terms of the search query based on parallel corpora obtained from the one or more documents in the second language.

* * * * *